(12) United States Patent
Sasaki (10) Patent No.: US 8,746,081 B2
(45) Date of Patent: Jun. 10, 2014

(54) BICYCLE FORCE SENSING ASSEMBLY

(75) Inventor: Bungo Sasaki, Osaka (JP)

(73) Assignee: Shimano Inc., Osaka (JP)

( * ) Notice: Subject to any disclaimer, the term of this patent is extended or adjusted under 35 U.S.C. 154(b) by 282 days.

(21) Appl. No.: 13/104,172

(22) Filed: May 10, 2011

(65) Prior Publication Data

US 2012/0285265 A1 Nov. 15, 2012

(51) Int. Cl.
*G01L 1/22* (2006.01)

(52) U.S. Cl.
USPC ........................................ 73/862.045

(58) Field of Classification Search
USPC ..................... 73/862.041–862.046
See application file for complete search history.

(56) References Cited

U.S. PATENT DOCUMENTS

| | | | |
|---|---|---|---|
| 4,112,751 A | 9/1978 | Grunbaum | |
| 4,145,919 A | 3/1979 | Bauer et al. | |
| 4,341,122 A | 7/1982 | Lechler et al. | |
| 5,140,849 A | 8/1992 | Fujita et al. | |
| 5,952,587 A | 9/1999 | Rhodes et al. | |
| 6,490,935 B1 | 12/2002 | Joki et al. | |
| 6,644,135 B1 | 11/2003 | Kishimoto et al. | |
| 6,920,801 B2 | 7/2005 | Van Leeuwen et al. | |
| 7,516,677 B2 | 4/2009 | Watarai et al. | |
| 7,806,006 B2 * | 10/2010 | Phillips et al. | 73/862.338 |
| 8,117,923 B2 * | 2/2012 | Sasaki | 73/862.49 |
| 2009/0025517 A1 * | 1/2009 | Fukui et al. | 81/57.34 |
| 2010/0282001 A1 | 11/2010 | Sasaki | |
| 2011/0179862 A1 * | 7/2011 | Grab | 73/379.01 |
| 2012/0285264 A1 * | 11/2012 | Sasaki | 73/862.045 |

FOREIGN PATENT DOCUMENTS

| | | |
|---|---|---|
| CN | 101279630 A | 10/2008 |
| CN | 101327828 A | 12/2008 |
| EP | 1 361 822 B1 | 5/2008 |
| JP | 11-258078 A | 9/1999 |
| JP | 2000-283864 A | 10/2000 |

* cited by examiner

*Primary Examiner* — Lisa Caputo
*Assistant Examiner* — Octavia D. Hollington
(74) *Attorney, Agent, or Firm* — Global IP Counselors (57) ABSTRACT

A bicycle force sensing assembly is basically provided with a first attachment member, a second attachment member, a first translation sensing device and a second translation sensing device. The first attachment member is configured to be mounted to a first side of a bicycle bottom bracket hanger and configured to receive and rotatably support a crank axle. The second attachment member is configured to be mounted to a second side of the bicycle bottom bracket hanger and configured to receive and rotatably support the crank axle. The first translation sensing device is coupled to the first attachment member such that the first translation sensing device senses strain on the first attachment member. The second translation sensing device is coupled to the second attachment member such that the second translation sensor senses strain on the second attachment member.

19 Claims, 7 Drawing Sheets

BICYCLE FORCE SENSING ASSEMBLY

BACKGROUND

1. Field of the Invention

This invention generally relates to a bicycle force sensing assembly. More specifically, the present invention relates to a bicycle force sensing assembly for sensing a pedaling force being applied to a crank axle.

2. Background Information

Bicycles are sometimes equipped with a force sensor for detecting a force acting on the bicycle crank axle. For example, in U.S. Pat. No. 7,516,677 (assigned to Shimano Inc.), a cylindrical torsion-detecting sleeve member (force sensor unit) is provided on a crank axle for detecting a torque applied to the crank axle. Another example of a force sensor for detecting force acting on the bicycle crank axle is disclosed in EP Patent Publication No. 1,361,822. In this patent publication, sensors are positioned between a radial inner surface of the bottom bracket tube and a radially extending outer surface of an annular member that surrounds one of the crank axle bearings. With these arrangements, the strain sensors only detect the pedaling force acting on the bicycle crank axle from one leg. Thus, with these arrangements, the calculated pedaling force can sometimes be inaccurate.

SUMMARY

One object of the present invention is to provide a bicycle force sensing assembly that can more accurately measure the pedaling force acting on the bicycle crank axle.

The foregoing object can basically be attained by providing a bicycle force sensing assembly that basically comprises a first attachment member, a second attachment member, a first translation sensing device and a second translation sensing device. The first attachment member is configured to be mounted to a first side of a bicycle bottom bracket hanger and configured to receive and rotatably support a crank axle. The second attachment member is configured to be mounted to a second side of the bicycle bottom bracket hanger and configured to receive and rotatably support the crank axle. The first translation sensing device is coupled to the first attachment member such that the first translation sensing device senses strain on the first attachment member. The second translation sensing device is coupled to the second attachment member such that the second translation sensor senses strain on the second attachment member.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
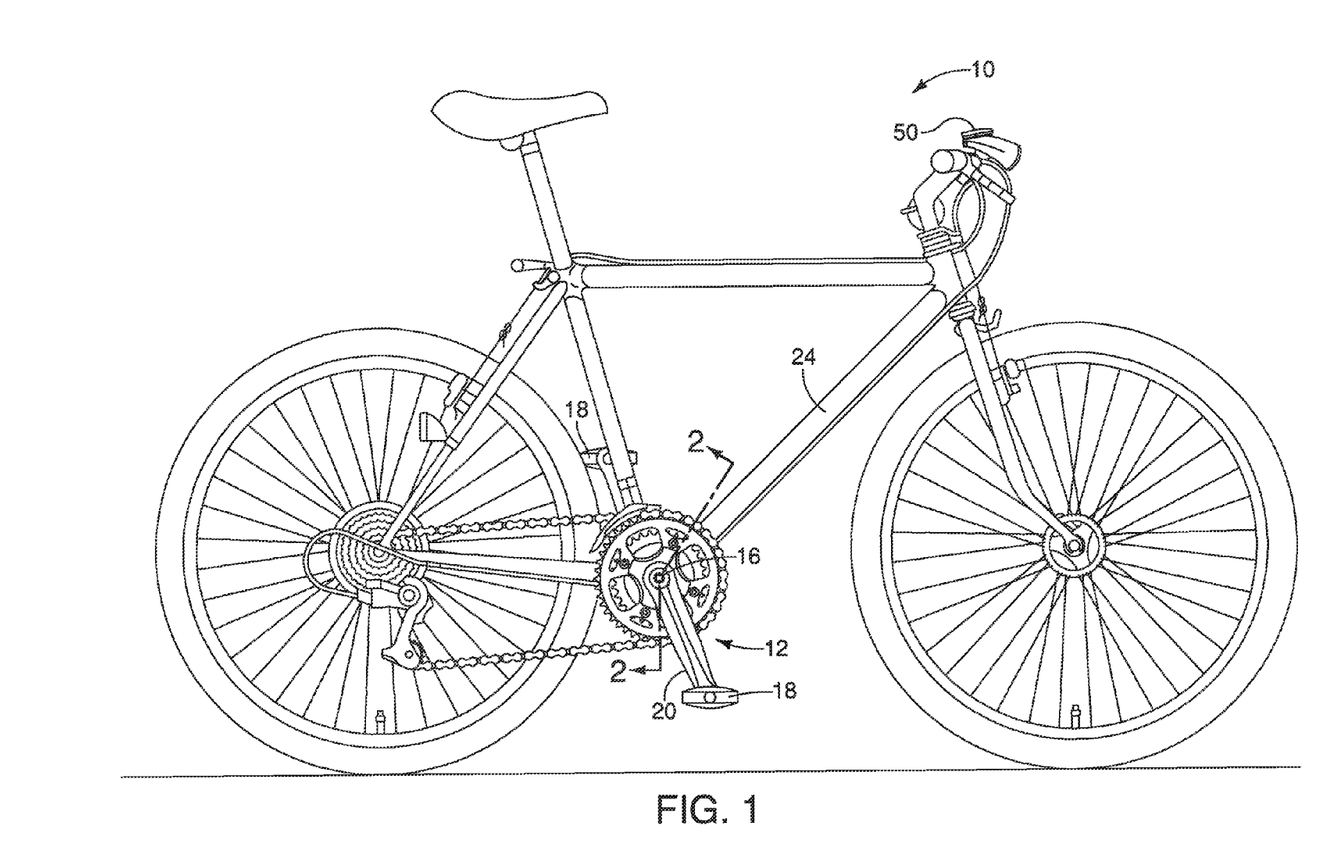
FIG. 1 is a side elevational view of a bicycle showing a frame with a bottom bracket tube equipped with a bicycle force sensing assembly in accordance with a first embodiment.
Figure 2:
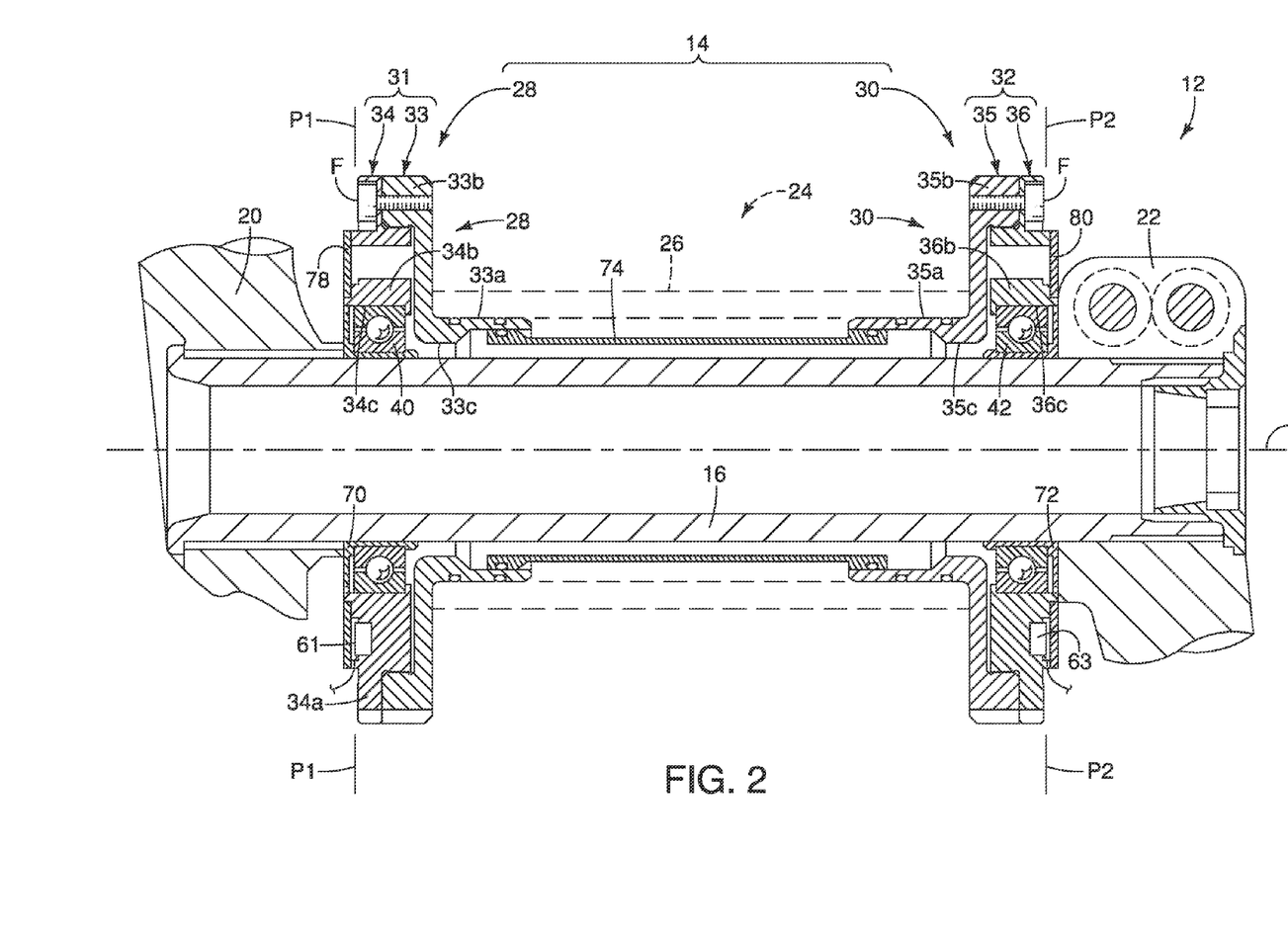
FIG. 2 is a cross-sectional view of the bottom bracket tube of the bicycle taken along the section line 2-2 in FIG. 1 showing the bicycle force sensing assembly mounted on the bottom bracket in accordance with the first embodiment.
Figure 3:
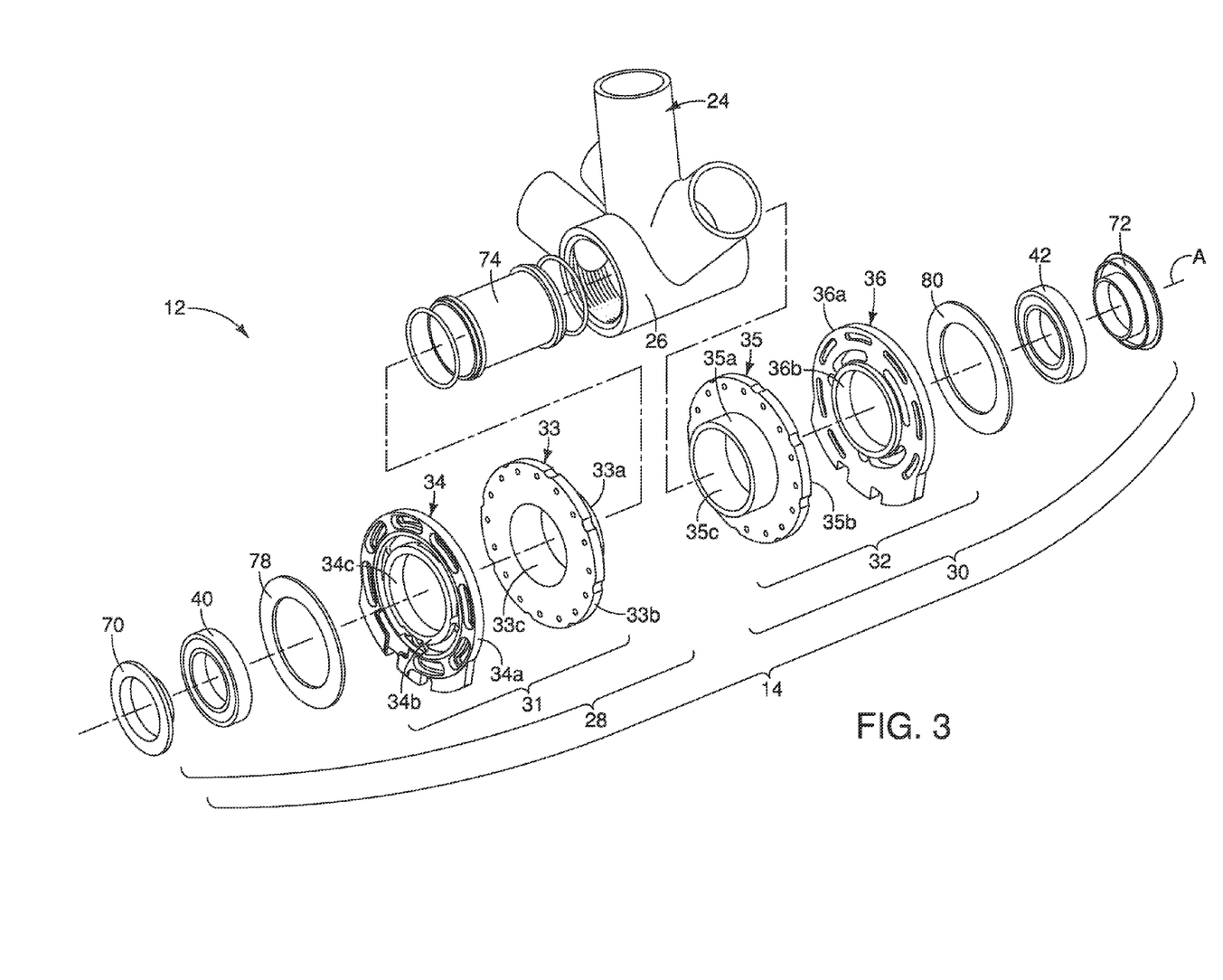
FIG. 3 is an exploded perspective view of selected parts of the front crank assembly and the bicycle force sensing assembly with respect to the bottom bracket hanger in accordance with the first embodiment.

Referring initially to FIGS. 1 to 3, a bicycle 10 is illustrated that has a crank axle assembly 12 that is equipped with a bicycle force sensing assembly 14 (shown in FIGS. 2 and 3) in accordance with a first embodiment. As shown in FIGS. 2 and 3, the force sensing assembly 14 that is configured to sense the force applied by a cyclist (not shown) on both sides of a crank axle 16 (shown in FIG. 2) of the crank axle assembly 12 as the cyclist applies force on a pair of bicycle pedals 18 (shown in FIG. 1) via a pair of crank arms 20 and 22. The bicycle pedals 18 include conventional binding devices configured to releasably retain cleats on cycling shoes (not shown) in a conventional manner. Specifically, when mating cycling shoes are retained by the bicycle pedals 18, rotary power produced by the cyclist (not shown) is transmitted from the cycling shoes to the bicycle pedals 18 during both downward cycling motion and upward cycling motion.

As seen in FIGS. 2 and 3, the crank axle assembly 12 is mounted to a bicycle frame 24 of the bicycle 10. In particular, the crank axle assembly 12 is mounted to a bottom bracket hanger 26 of the frame 24. The bottom bracket hanger 26 is configured to receive the crank axle 16 therein to rotatably support the crank axle 16. The crank axle 16 is a hollow cylindrical member that is rotatably mounted to extend through the bottom bracket hanger 26, as shown in FIG. 2. The right crank 20 is fixed to the right end of the crank axle 16, while the left crank 22 is detachably fixed to the left end of the crank axle 16. The crank axle 16 is configured to rotate about a rotation axis A that extends through the center of the crank axle 16. Thus, the rotation axis A is also a center axis of the crank axle 16 and the bottom bracket hanger 26. While the crank axle 16 is illustrated as hollow cylindrical member, the crank axle 16 is not limited to a hollow cylindrical member. For example, it is also acceptable for the crank axle to be a solid rod with the crank arms are fixed to the crank axle by bolts. The frame 24 can be made of metallic tube sections welded together, or alternatively, can be made of composite materials such that the tubes of the frame 24 are fixed to one another by resin and/or carbon fiber materials. Since the frame 24 is a conventional feature of the bicycle 10, further description of the frame 24, other than the bottom bracket hanger 26 has been omitted for the sake of brevity.

The bottom bracket hanger 26 is a hollow tubular element with open ends. The bottom bracket hanger 26 is sometimes referred to as a bottom bracket tube. The bottom bracket hanger 26 is configured to support the crank axle 16 and elements associated with the crank axle 16 in a relatively conventional manner. Each of the open ends of the bottom bracket hanger 26 supports the force sensing assembly 14 in a manner described in greater detail below.

of the open ends of the bottom bracket hanger 26 can be configured without machine threads to receive crank axle supporting elements.

A description of the bicycle force sensing assembly 14 is now provided with specific reference to FIGS. 2 to 6. The bicycle force sensing assembly 14 basically includes a first bicycle force sensing device 28 and a second bicycle force sensing device 30. The first bicycle force sensing device 28 is mounted on the right end of the crank axle 16, while the second bicycle force sensing device 30 is mounted on the left end of the crank axle 16. Thus, the first bicycle force sensing device 28 detects a pedaling force applied to the right end of the crank axle 16 by a rider's right leg, and the second bicycle force sensing device 30 detects a pedaling force applied to the left end of the crank axle 16 by a rider's left leg. In the illustrated embodiment, the first and second bicycle force sensing devices 28 and 30 are identical in construction. In allows for a single part to be manufactured for both of the first and second bicycle force sensing devices 28 and 30. Of course, the first and second bicycle force sensing devices 28 and 30 can have different configurations as needed and/or desired. The first bicycle force sensing device 28 is mounted to the right end of the crank axle 16 by a first attachment member 31, while the second bicycle force sensing device 30 is mounted to the left end of the crank axle 16 by a second attachment member 32. In the first illustrated embodiment, the first and second attachment members 31 and 32 are each configured to be non-movably mounted to the bottom bracket hanger 26 by a press-fit arrangement. Alternatively, each of the open ends of the bottom bracket hanger 26 includes an internal machine thread such that the first and second attachment members 31 and 32 are threaded into the open ends of the bottom bracket hanger 26.

Figure 4:
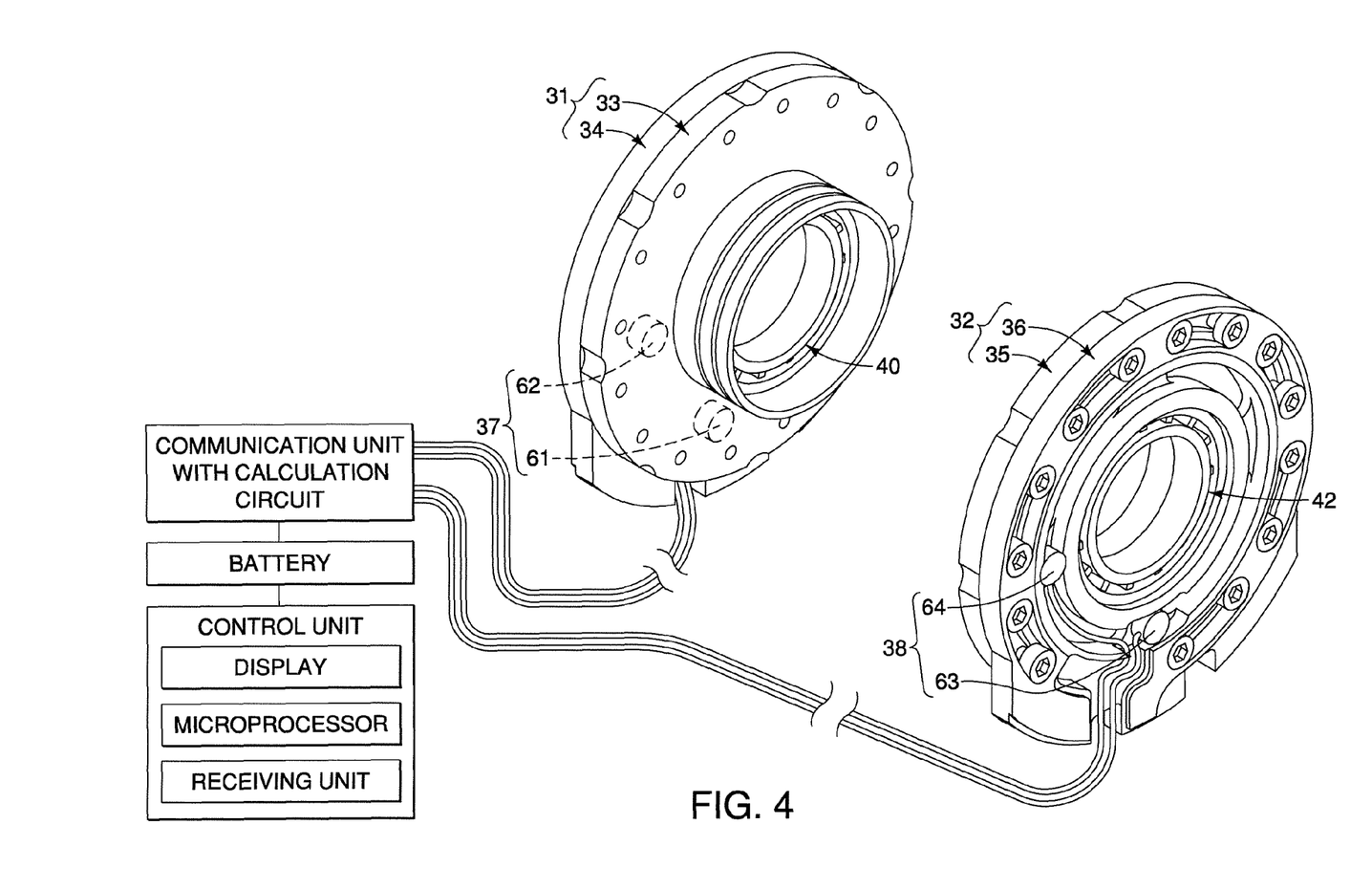
FIG. 4 is a perspective view of the bicycle force sensing assembly shown with the covers removed and the communication unit and the control unit shown as a simplified block diagram in accordance with the first embodiment.
Figure 5:
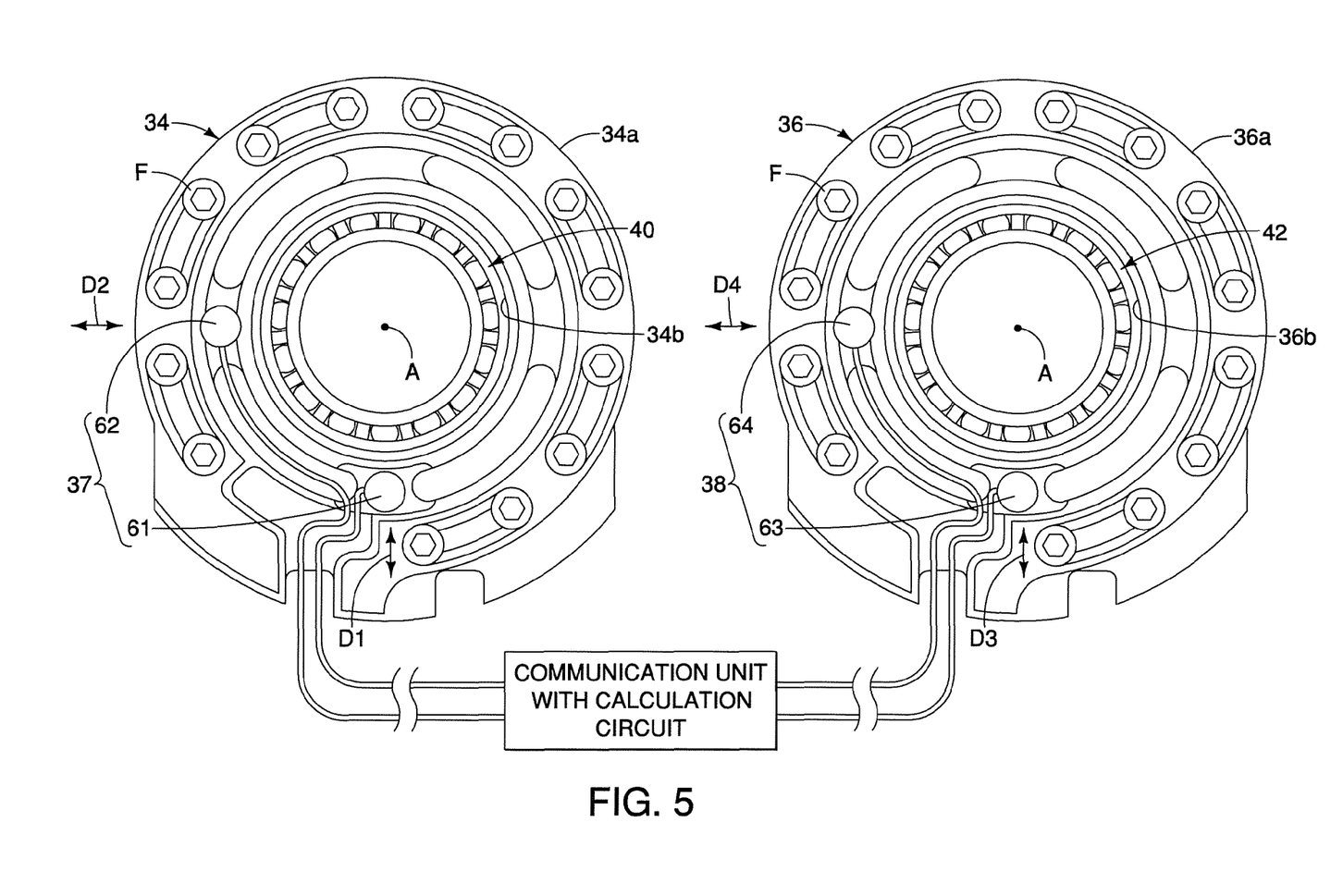
FIG. 5 is a side elevational view of the bicycle force sensing assembly shown with the covers removed and the communication unit shown as a simplified block diagram in accordance with the first embodiment.

In this first illustrated embodiment, as seen in FIG. 3, the first attachment member 31 is a two piece structure that includes an adaptor 33 and a main body 34. The main body 34 is fixedly secured to the adaptor 33 by a plurality of fasteners F as seen in FIGS. 4 and 5 such that the adaptor 33 and the main body 34 form an integrated unit. Likewise, the second attachment member 32 is a two piece structure that includes an adaptor 35 and a main body 36. The main body 36 is fixedly secured to the adaptor 35 by a plurality of fasteners F as seen in FIG. 5 such that the adaptor 35 and the main body 36 form an integrated unit.

In order to determine the pedaling force applied to the ends of the crank axle 16, a first translation detecting structure 37 is coupled to the main body 34 of the first attachment member 31 and a second translation detecting structure 38 is coupled to the main body 36 of the second attachment member 32. The first translation sensing device 37 senses strain on the first attachment member 31. The second translation sensing device 38 senses strain on the second attachment member 32.

The first and second translation detecting structures 37 and 38 are discussed below in greater detail.

In this first illustrated embodiment, the adaptor 33 constitutes a first portion of the first attachment member 31 that is configured to be attached to the bicycle bottom bracket hanger 26, while the main body 34 constitutes a second portion of the first attachment member 31 having the first translation detecting structure 37 attached thereto. Similarly, the adaptor 35 constitutes a first portion of the second attachment member 32 that is configured to be attached to the bicycle bottom bracket hanger 26, while the main body 36 constitutes a second portion of the second attachment member 32 having the second translation detecting structure 38 attached thereto. The adaptor 35 and the main body 36 can also be considered third and fourth portions, respectively, of the second attachment member 32 when considering the first and second attachment members 31 and 32 together as part of the bicycle force sensing assembly 14. As seen in FIG. 2, the main bodies 34 and 36 (i.e., second and fourth portions) are configured to be disposed outside of the bicycle bottom bracket hanger 26.

The basic construction of the first and second attachment members 31 and 32 basically the same as the force sensor assembly as disclosed in U.S. Patent Publication No. 2010/0282001. Of course, it will be apparent to those skilled in the art from this disclosure that other configurations can also be used for the first and second attachment members 31 and 32. For example, the main body and the adaptor can be fixed together by welding, adhesive and/or a press fit instead of bolts. Moreover, it is also possible to make the main body and the adaptor as a one-piece, unitary member if needed and/or desired. Also the main bodies 34 and 36 are not limited to a bridge body having a plurality of circumferentially arranged through openings. Rather, the main bodies 34 and 36 can be a plain body types that are free of any through openings. However, by configuring the main bodies 34 and 36 as a bridge body type results in the main bodies 34 and 36 being more sensitive to torque inputs since the bridge body type more readily changes its shape as compared to the plain body type.

In the first illustrated embodiment, the adaptor 33 of the first attachment member 31 constitutes a first portion that is configured to be attached to the bicycle bottom bracket hanger 26, while the main body 34 constitutes a second portion having the first translation sensing device 37 attached thereto. The main body 34 (e.g., the second portion) is configured to be disposed outside of the bicycle bottom bracket hanger 26 as best seen in FIG. 2. The main body 34 also supports the first bearing unit 40 such that the first bearing unit 40 is disposed outside of the bicycle bottom bracket hanger 26 as best seen in FIG. 2. However, it is also acceptable to configure the main body 34 such that the first bearing unit 40 is disposed inside the bicycle bottom bracket hanger 26 as needed and/or desired.

In the first illustrated embodiment, the first attachment member 31 is also provided with a first bearing unit 40 that is press fitted into the main body 34. Thus, the first attachment member 31 is configured to be mounted to a first side of the bottom bracket hanger 26 and configured to receive and rotatably support the crank axle 16 via the first bearing unit 40. Likewise, the second attachment member 32 is also provided with a second bearing unit 42 that is press fitted into the main body 36. Thus, the second attachment member 32 is configured to be mounted to a second side of the bottom bracket hanger 26 and configured to receive and rotatably support the crank axle 16 via the second bearing unit 42.

As indicated in FIG. 2, the adaptors 33 and 35 are installed to the bottom bracket hanger 26 such that the force sensing assembly 14 are disposed between the bottom bracket hanger 26 and the crank arms 20 and 22. The adaptors 33 and 35 are each preferably a one-piece, unitary member that is made of a metallic material, such as steel, aluminum, titanium or a suitable alloy with appropriate rigidity and strength. As mentioned above, the adaptors 33 and 35 are configured to be fixedly secured to opposite ends of the bottom bracket hanger 26.

In the first illustrated embodiment, the adaptor 33 is provided with a tubular mounting part 33a and an annular flange or part 33b. Likewise, the adaptor 35 is provided with a tubular mounting part 35a and an annular flange or part 35b. The tubular mounting parts 33a and 35a are dimensioned to be press fitted into opposite ends of the bottom bracket hanger 26 for fixedly securing the bicycle force sensing assembly 14 to the bottom bracket hanger 26. Alternatively, the tubular mounting parts 33a and 35a can be threaded to the bottom bracket hanger 26. The tubular mounting parts 33a and 35a define inner openings 33c and 35c, respectively, for receiving the crank axle 16 therethrough. The annular flanges 33b and 35b extend radially from the tubular mounting parts 33a and 35a, respectively. The annular flanges 33b and 35b are fixedly attached to the main bodies 34 and 36, respectively, at their outer peripheries. Thus, the adaptors 33 and 35 support the main bodies 34 and 36 in a radial direction relative to the rotation axis A and in directions parallel to the rotational axis A.

The main bodies 34 and 36 are each preferably made as a one-piece, unitary member of a metallic material, such as steel, aluminum, titanium or a suitable alloy with appropriate rigidity and strength. The thickness and overall dimensions of the main bodies 34 and 36 are determined by the anticipated forces that will act on the crank axle 16, the materials used and the size and type of bicycle to be equipped with the force sensing assembly 14. In the first illustrated embodiment, the main body 34 has an outer portion 34a and an inner portion 34b defining a bearing receiving opening 34c, while the main body 36 has an outer portion 36a and an inner portion 36b defining a bearing receiving opening 36c. The first and second translation sensing devices 37 and 38 are disposed in the intermediate areas of the outer portions 34a and 36a for detecting the strain occurring in the main bodies 34 and 36 as a result of the rotation of the crank axle 16. The outer portions 34a and 36a are attached to the annular flanges 33b and 35b by the fasteners F. The first and second bearing units 41 and 42 are press fitted into the bearing receiving openings 34c and 36c of the inner portions 34b and 36b such that the torque of the crank axle 16 is inputted to the main bodies 34 and 36.

As seen in FIG. 4, the bicycle force sensing assembly 14 also includes a communication unit 46 that is electrically connected to the first and second translation sensing devices 37 and 38 by electrical wires 48 for receiving electrical signals from the first and second translation sensing devices 37 and 38. In other words, the communication unit 46 is operatively coupled to first and second translation sensing devices 37 and 38 such that signals from first and second translation sensing devices 37 and 38 are received by the communication unit 46. The communication unit 46 is separate from the first and second attachment members 31 and in the first embodiment. However, the communication unit 46 can be supported on the first attachment member 31 or the second attachment member 32 if needed and/or desired. The communication unit 46 includes a calculation circuit that receives signals from first and second translation sensing devices 37 and 38 for calculating the strain being applied to the main bodies 34 and 36 due to the pedaling force being applied to the crank axle 16.

As seen in FIG. 4, the bicycle 10 further includes (among other things) a control unit 50 and a battery 52. The control unit 50 is attached to a forward section of the frame 24, such as the handlebar. The control unit 50 receives signals and/or controls various components of the bicycle 10 as needed and/or desired. For example, the control unit 50 can receive the RPM data from a cadence sensor, gear position data from a gear positioning sensor and force data from the first translation sensing device 37 via the communication unit 46. Using this data, the control unit 50 can control an automatic shifting system (not shown).

The force sensing assembly 14 is operatively connected to the control unit 50 and the battery 52. As mentioned below, the control unit 50 can be configured to determine the torque being applied to the crank axle 16 using strain measurement signals provided by the force sensing assembly 14, or the communication unit 46 can determine the torque being applied to the crank axle 16 using strain measurement signals provided by the force sensing assembly 14 and then communicate the calculation results to the control unit 50. The calculations can be performed in any desired manner. For example, the strain measurement signals provided by the force sensing assembly 14 can be used to determine the torque being applied to the crank axle 16 in the same manner as in U.S. Patent Publication No. 2010/0282001. For example, the communication unit 46 or the control unit 50 can calculate the power using the following formula:

$$P = Fc \cdot Vc$$

where:
Vc is chain speed $$Vc = \omega \cdot Gr$$

where:
$\omega$ is rotation speed (calculated based on signal from a cadence sensor)
Gr is the semidiameter of an active chain ring (based on signal from a gear positioning sensor)

The control unit 50 can calculate an average torque T (per rotation) using the following formula:

$$T = \omega/P$$

As seen in FIG. 4, the control unit 50 basically includes a display 54, a microprocessor 56 and a signal receiving unit 58. While the display 54, the microprocessor 56 and the signal receiving unit 58 are illustrated as being disposed in a single housing on the handlebar of the bicycle 10 in FIG. 1, these components can be separated and mounted at different locations on the bicycle 10 as needed and/or desired. The battery 52 supplies electrical power to the first and second translation sensing devices 37 and 38 via the communication unit 46 in the first embodiment. The battery 52 also supplies electrical power to the control unit 50 in the first embodiment. It will be apparent from this disclosure that other powers sources can be used as needed and/or desired for supplying the necessary electrical power to the various components.

In the first embodiment, the communication unit 46 and the control unit 50 are separate members in which data is communicated from the communication unit 46 to the control unit 50 for displaying to the rider and/or for use in an automatic shifting system or other bicycle systems. However, the communication unit 46 and the control unit 50 can be integrated into a single unit as needed and/or desired. Moreover, while the communication unit 46 is illustrated as including a calculation circuit, it will be apparent from this disclosure that the communication unit 46 can translate the signals from first and second translation sensing devices 37 and 38 to the control unit 50 (e.g., a cycle computer or a controller) via wireless communications or a wire such that some or all of the calculations are performed by the control unit 50. In other words, the signal receiving unit 58 can be I/O interface that electrically connected to the communication unit 46 by an electrical cable and/or the signal receiving unit 58 can be a wireless receiver.

As seen in FIG. 5, the first translation sensing device 37 is coupled to the first attachment member 31 such that the first translation sensing device 37 senses strain on the first attachment member 31 in a first strain measurement direction D1 and in a second strain measurement direction D2 that is nonparallel to the first strain measurement direction D1. In the first illustrated embodiment, the first translation sensing device 37 includes a first translation sensor 61 and a second translation sensor 62. The first and second translation sensors 61 and 62 constitute a first translation detecting structure that senses strain on the first attachment member 31 in the first and second strain measurement directions D1 and D2. The first translation sensor 61 senses strain on the first attachment member 31 in the first strain measurement direction D1. The second translation sensor 62 senses strain on the first attachment member 31 in the second strain measurement direction D2. In the first illustrated embodiment, the first and second translation sensors 61 and 62 are individual sensors that are spaced apart from each other.

In the first illustrated embodiment, for example, the first and second translation sensors 61 and 62 are semiconductor sensors. A semiconductor sensor has four strain measurement elements which form a bridge circuit for sensing two strain measurement directions. Since a semiconductor sensor can sense two strain measurement directions, it is possible to eliminate one of the first and second translation sensors 61 and 62 to reduce costs. For reducing the overall costs of manufacturing the bicycle force sensing assembly 14, it is preferably for the first and second translation sensors 61 and 62 to each only include a single strain measurement element, respectively. However, for improved performance and functions, it is preferably for the first and second translation sensors 61 and 62 to each include at least two strain measurement elements, respectively. The strain in the main body 34 in the first strain measurement directions D1 is proportional to a force of pedaling in the first strain measurement directions D1. The strain in the main body 34 in the second strain measurement directions D2 is proportional to a force of pedaling in the second strain measurement directions D2. By sensing the strain in the main body 34 in both the first and second strain measurement directions D1 and D2, the force sensing assembly 14 can merge the result of the first and second translation sensors 61 and 62 to obtain the information of a force of pedaling and a direction of the pedaling. The relationships between the strains detected by the first and second translation sensors 61 and 62 and the pedaling force are predetermined.

Still referring to FIG. 5, the second translation sensing device 38 is coupled to the second attachment member 32 such that the second translation sensing device 38 senses strain on the second attachment member 32 in a third strain measurement direction D3 and in a fourth strain measurement direction D4 that is nonparallel to the third strain measurement direction D3. In the first illustrated embodiment, the second translation sensing device 38 includes a third translation sensor 63 and a fourth translation sensor 64. The third and fourth translation sensors 63 and 64 constitute a second translation detecting structure that senses strain on the second attachment member 32 in the third and fourth strain measurement directions D3 and D4. The third and fourth strain measurement directions D3 and D4 are parallel to the first and second strain measurement directions D1 and D2, respectively. The third translation sensor 63 senses strain on the second attachment member 32 in the third strain measurement direction D3. The third translation sensor 63 senses strain on the second attachment member 32 in the fourth strain measurement direction D4. In the first illustrated embodiment, the third and fourth translation sensors 63 and 64 are individual sensors that are spaced apart from each other.

In the first illustrated embodiment, for example, the third and fourth translation sensors 63 and 64 are semiconductor sensors. A semiconductor sensor has four strain measurement elements which form a bridge circuit for sensing two strain measurement directions. Since a semiconductor sensor can sense two strain measurement directions, it is possible to eliminate one of the third and fourth translation sensors 63 and 64 to reduce costs. For reducing the overall costs of manufacturing the bicycle force sensing assembly 14, it is preferably for the third and fourth translation sensors 63 and 64 to each only include a single strain measurement element, respectively. However, for improved performance and functions, it is preferably for the third and fourth translation sensors 63 and 64 to each include at least two strain measurement elements, respectively. The strain in the main body 36 in the first strain measurement directions D3 is proportional to a force of pedaling in the first strain measurement directions D3. The strain in the main body 36 in the second strain measurement directions D4 is proportional to a force of pedaling in the second strain measurement directions D4. By sensing the strain in the main body 36 in both the third and fourth strain measurement directions D3 and D4, the force sensing assembly 14 can merge the result of the first and second translation sensors 63 and 64 to obtain the information of a force of pedaling and a direction of the pedaling. The relationships between the strains detected by the third and fourth translation sensors 63 and 64 and the pedaling force are predetermined.

As seen in FIGS. 4 and 5, for example, the translation sensors 61, 62, 63 and 64 are arranged with respect to the first and second attachment members 31 and 32 such that the first and second strain measurement directions D1 and D2 are substantially (i.e., within ten degrees) perpendicular to each other and the third and fourth strain measurement directions D3 and D4 are substantially (i.e., within ten degrees) perpendicular to each other. In the first embodiment, the translation sensors 61, 62, 63 and 64 are mounted on the outboard side of the main bodies 34 and 36 that faces away the bottom bracket hanger 26 of the bicycle 10. However, the translation sensors 61, 62, 63 and 64 can be disposed between the main bodies 34 and 36 and the adaptors 33 and 34, respectively. Alternatively, the translation sensors 61, 62, 63 and 64 can be disposed such that one of the translation sensors is on the outboard side of the corresponding main body and one is on the inboard side of the corresponding main body. The first and second translation sensors 61 and 62 are each retained in a recess of the main body 34 using a resin for providing a waterproof seal.

The translation sensors 61, 62, 63 and 64 are arranged with respect to the first and second attachment members 31 and 32 such that the strain measurement directions D1, D2, D3 and D4 passes through the rotation axis A of the crank axle 16. Preferably, the translation sensors 61, 62, 63 and 64 are arranged with respect to the first and second attachment members 31 and 32 such that at least one the first and second strain measurement directions D1 and D2 lie in a single predetermined plane P1 (FIG. 2) and at least one the third and fourth strain measurement directions D3 and D4 lie in a single predetermined plane P2 (FIG. 2). The predetermined planes P1 and P2 are substantially perpendicularly arranged with respect to the rotation axis A of the crank axle receiving openings of the first and second attachment members 31 and 32.

The first and second translation sensing devices 37 and 38 are not limited to the particular arrangement shown in FIGS. 2 to 5. The translation sensors 61, 62, 63 and 64 can be arranged with respect to the first and second attachment members 31 and 32 such that the strain measurement directions D1, D2, D3 and D4 are offset from the rotation axis A of the crank axle 16. While the strain measurement directions D1 and D3 are preferably arranged at an angle of 90° relative to the strain measurement directions D2 and D4, respectively, the angles between the strain measurement directions D1 and D3 and the strain measurement directions D2 and D4, respectively, are not limited to 90° or substantially 90°. The angles between the strain measurement directions D1 and D3 and the strain measurement directions D2 and D4, respectively, can be any angle that allows the results of the translation sensors 61, 62, 63 and 64 to be used to obtain information of a pedaling force and a pedaling direction applied to the crank axle 16. The first and second translation sensing devices 37 and 38 are arranged with respect to the first and second attachment members 31 and 32 such that the strain measurement directions D1, D2, D3 and D4 extends along predetermined planes which are not perpendicularly (angled by up to 15 degrees) arranged with respect to the rotation axis A of the crank axle 16.

Optionally, a first dust seal or cover 70 is provided to cover the first bearing unit 40, and a second dust seal or cover 72 is provided to cover the second bearing unit 42. A dust tube 74 is also optionally provided between the adaptors 33 and 35 to form a seal within the bottom bracket hanger 26. Also optionally, a first dust seal or cover 78 is provided to cover the translation sensors 61 and 62, and a second dust seal or cover 80 is provided to cover translation sensors 63 and 64. The covers 70, 72, 78 and 80 are annular members that are preferably made of an electrically insulating material that is also water resistant. Consequently, the covers 70 and 78 enclose and seal the bearing unit 40 and the translation sensors 61 and 62 against water and debris, and thus protecting the bearing unit 40 and the translation sensors 61 and 62. Similarly, the covers 72 and 80 enclose and seal the bearing unit 42 and the translation sensors 63 and 64 against water and debris, and thus protecting the bearing unit 42 and the translation sensors 63 and 64.

Figure 6:
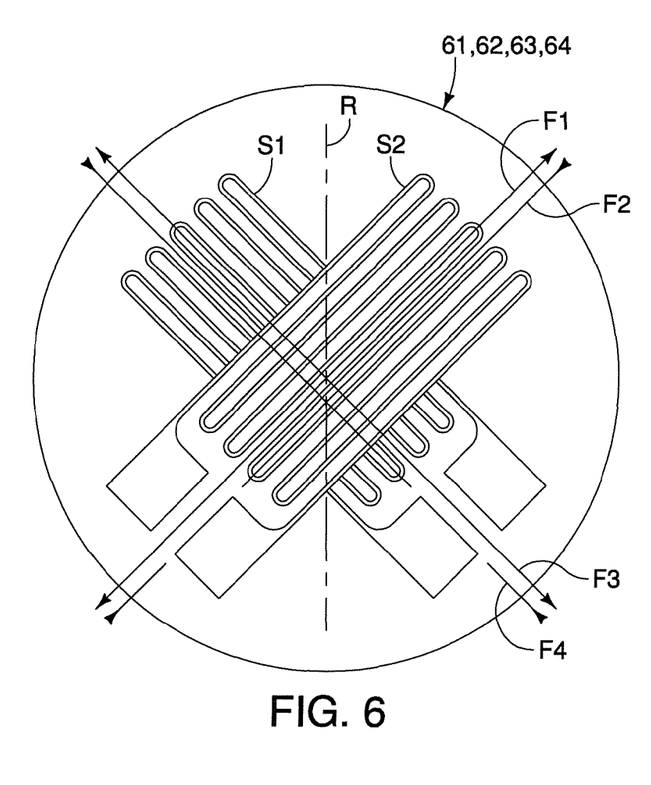
FIG. 6 is an enlarged side elevational view of a main body in which the translation sensors are formed of a pair of strain gauges.

As seen in FIG. 6, an alternate configuration of the translation sensors 61, 62, 63 and 64 are illustrated. Instead of using a semiconductor sensor, the translation sensors 61, 62, 63 and 64 are illustrated as conventional strain gauges which are also sometimes referred to foil strain gauges. The translation sensors 61, 62, 63 and 64 are fixed to the desired surface using a conventional adhesive appropriate for strain gauges. The main body 34 or 36 are dimensioned and shaped to undergo limited elastic deformation that is measurable by the first and second strain gauges S1 and S2. As is known in the art, properties associated with the electrical conductivity of conventional strain gauges changes in response to either elongation or compression of the strain gauge. It should be understood from the drawings and the description herein that it is also possible to detect the strain in two directions by each of the translation sensors 61, 62, 63 and 64, if the detection circuits that are connected to the translation sensors 61, 62, 63 and 64 are selective changed by a microcomputer.

In the case of a foil strain gauge arrangement, each of the translation sensors 61, 62, 63 and 64 has a first strain gauge S1 and a second strain gauge S2. Preferably, the translation sensors 61, 62, 63 and 64 are identical to one another except for their mounting position. The first and second strain gauges S1 and S2 are conventional strain gauges that are fixed to the desired surface using a conventional adhesive appropriate for strain gauges. However, it should be understood from the drawings and the description herein that any of a variety of strain measuring devices can be used as needed and/or desired.

As shown in FIG. 6, the first strain gauge S1 measures elastic deformation in a tensile strain force F1 and a compressive strain force F2 of the main body 34 or 36. In other words, the tensile strain force F1 represents a slight elongation of the first strain gauge S1 in response to forces applied to the main body 34 or 36. The compressive strain force F2 represents a slight compression of the first strain gauge S1 in response to forces applied to the main body 34 or 36. The second strain gauge S2 measures elastic deformation in a tensile strain force F3 and a compressive strain force F4 of the main body 34 or 36. In other words, the tensile strain force F3 represents a slight elongation of the second strain gauge S2 in response to forces applied to the main body 34 or 36. The compressive strain force F4 represents a slight compression of the second strain gauge S2 in response to forces applied to the main body 34 or 36. The first and second strain gauges S1 and S2 and their respective strain forces F1, F2, F3 and F4 extend in directions that are angularly offset from a radial direction R of the main body 34 or 36 by an angle of substantially forty-five degrees. Further, the second strain gauge S2 is angularly offset from the first strain gauge S1 by an angle of substantially 90 degrees. The first and second strain gauges S1 and S2 of the translation sensors 61, 62, 63 and 64 are used in sensing the strain measurement directions D1, D2, D3 and D4 in the same manner as the semiconductor sensors of the first embodiment.

However, it should be understood from the drawings and the description herein that any of a variety of strain measuring devices can be used for measuring the strain in the main body 34 or 36 due to the pedaling force applied to the crank axle 16. In other words, the translation sensors 61, 62, 63 and 64 can be replaced with other types of strain measuring devices as needed and/or desired. In any event, the translation sensors 61, 62, 63 and 64 measure the strain in the main body 34 or 36 due to the pedaling force applied to the crank axle 16. The strain data from the translation sensors 61, 62, 63 and 64 is used then used by the calculation circuit of the communication unit or the control unit 50 to calculate and display torque information as needed and/or desired.

Figure 7:
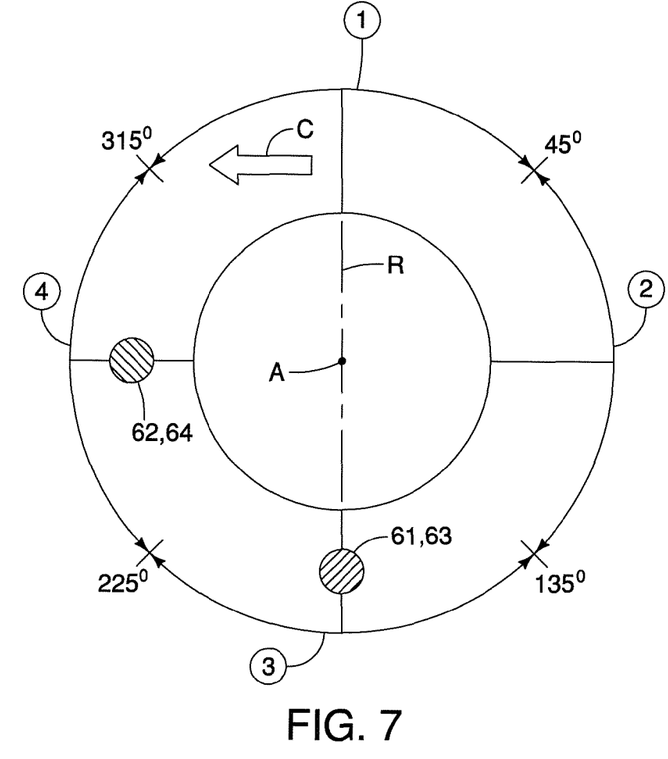
FIG. 7 is a schematic representation of the bicycle force sensing assembly showing four crank position regions used in calculating the pedaling force acting on the bicycle crank axle.

As seen in FIG. 7, four crank position regions ①, ②, ③ and ④ are depicted corresponding to calculated positions of the crank arms 20 and 22. Specifically, the crank position regions ①, ②, ③ and ④ each represents a 90 degrees angular region of a rotation of the crank axle 14. The strain at each of the four crank position regions is measured by the translation sensors 61, 62, 63 and 64. The actual position of the crank axle 16 relative to the rotation axis A is determined by signals from a cadence sensor (not shown). Since the cadence sensor also provides predetermined crank position data and RPM data, some crank positions are easily determined. For example, with a sampling frequency $F_1$ measured in Hz (hertz) and a time $T_1$ seconds per rotation of the crank axle 14, then by dividing $F_1$ by T1 ($F_1/T_1$) the crank positions are obtained. The strain measured changes depending upon the position of the crank. Specifically, the translation sensors 61, 62, 63 and 64 have differing responses depending upon the chain tension. The control unit 50 utilizes signals from the cadence sensor to determine the actual rotational location of the crank axle 16 and crank arms 20 and 22 and can therefore correlate detected average strain to each of the four crank position regions for each of the crank arms 20 and 22. The control unit 50 is programmed and/or configured to take the strain variations in all crank position regions into account using compensating constants. The sensitivity of the translation sensors 61, 62, 63 and 64 differs at the crank position regions ①, ②, ③ and ④. By processing corresponding strain data at each of the crank position regions ①, ②, ③ and ④, more consistent and reliable calculated chain tension is provided by the control unit 32. Further, using the compensation constants $a_1$ through $a_8$ eliminates the different levels of sensitivity between the first and second side strain gauges 84 and 86 at differing crank angles. Furthermore, using the average strain measurements from the translation sensors 61, 62, 63 and 64 can eliminate a hysteresis effects. In other words, by mathematically combining (or averaging) the signals from the translation sensors 61, 62, 63 and 64, the control unit 50 can compensate for any hysteresis effect. The calculation of the pedaling force is discussed in more detail in U.S. Patent Publication No. 2010/0282001.

Figure 8:
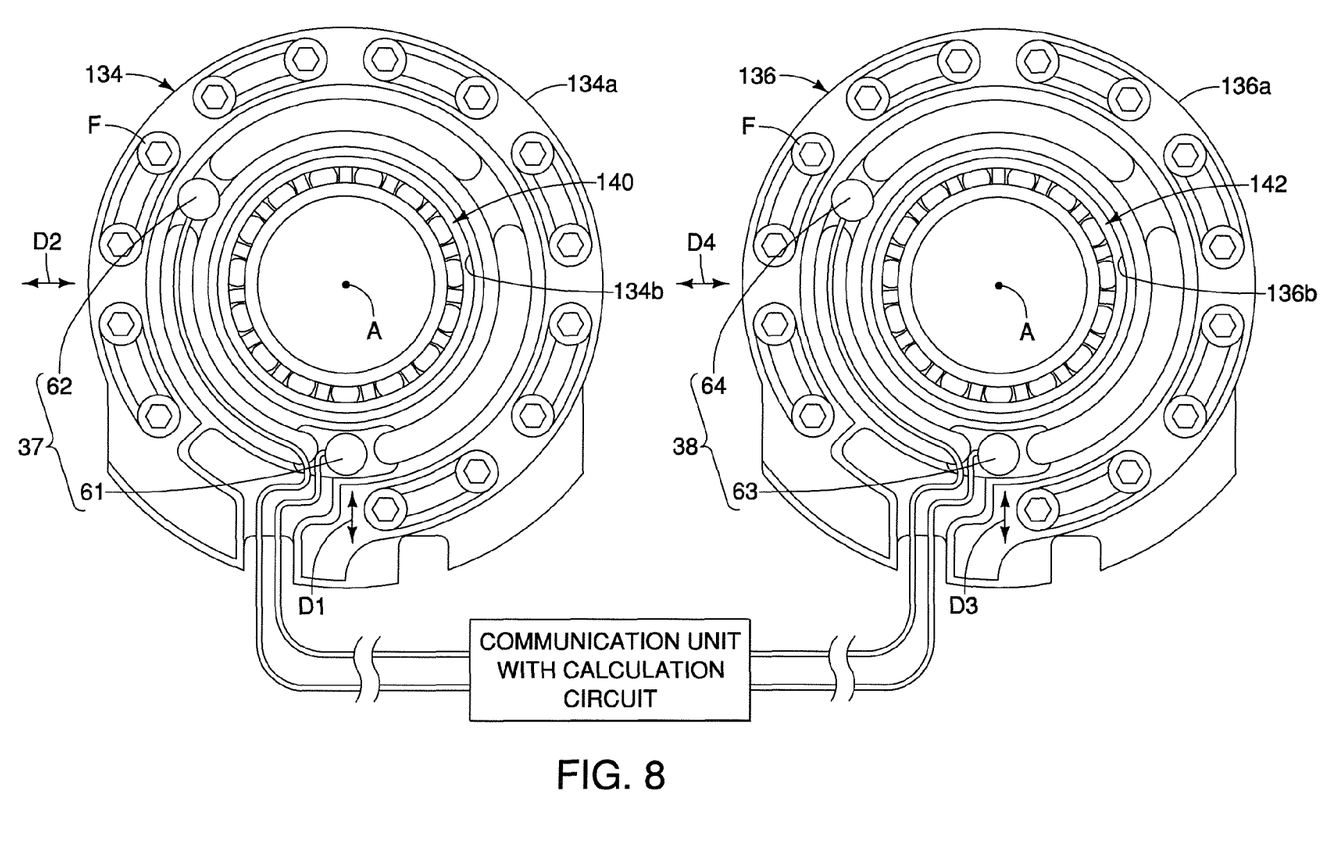
FIG. 8 is a side elevational view of the bicycle force sensing assembly shown with the covers removed and the communication unit shown as a simplified block diagram in accordance with a second embodiment.

As seen in FIG. 8, two alternative main bodies 134 and 136 are illustrated for use with the adaptors 33 and 35 of the first embodiment. In other words, the main bodies 134 and 136 are used in place of the main bodies 34 and 36 on the bicycle force sensing assembly 14. In FIG. 8, the locations of the translation sensors 61, 62, 63 and 64 have been changed. In particular, the translation sensors 61, 62, 63 and 64 are arranged so that the strain measurement directions D1, D2, D3 and D4 extends along predetermined planes which are not perpendicularly (angled by up to 15 degrees) arranged with respect to the rotation axis A. Moreover, the translation sensors 61, 62, 63 and 64 are arranged so that the strain measurement directions D1, D2, D3 and D4 do not pass through the rotation axis A.

While only selected embodiments have been chosen to illustrate the present invention, it will be apparent to those skilled in the art from this disclosure that various changes and modifications can be made herein without departing from the scope of the invention as defined in the appended claims. Components that are shown directly connected or contacting each other can have intermediate structures disposed between them, unless otherwise specified. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle force sensing assembly comprising:
 a first attachment member configured to be mounted to a first side of a bicycle bottom bracket hanger and configured to receive and rotatably support a crank axle;
 a second attachment member configured to be mounted to a second side of the bicycle bottom bracket hanger and configured to receive and rotatably support the crank axle;
 a first translation sensing device coupled to the first attachment member such that the first translation sensing device senses strain on the first attachment member; and
 a second translation sensing device coupled to the second attachment member such that the second translation sensor senses strain on the second attachment member.

2. The bicycle force sensing assembly according to claim 1, wherein
 the first translation sensing device includes a first translation detecting structure that senses strain on the first attachment member in a first strain measurement direction and in a second strain measurement direction that is nonparallel to the first strain measurement direction.

3. The bicycle force sensing assembly according to claim 2, wherein
 the first translation detecting structure includes a first translation sensor that senses strain on the first attachment member in the first strain measurement direction and a second translation sensor that senses strain on the first attachment member in the second strain measurement direction, the first and second translation sensors are being individual sensors.

4. The bicycle force sensing assembly according to claim 3, wherein
 the second translation detecting structure includes either at least a strain gauge or a semiconductor sensor.

5. The bicycle force sensing assembly according to claim 3, wherein
 the second translation detecting structure is arranged with respect to the second attachment member such that the third and fourth strain measurement directions are perpendicularly arranged with respect to each other.

6. The bicycle force sensing assembly according to claim 3, wherein
 the second translation detecting structure is arranged with respect to the second attachment member such that at least one of the first and second strain measurement directions extends along a predetermined plane which is substantially perpendicularly arranged with respect to a center axis of a crank axle receiving opening of the second attachment member.

7. The bicycle force sensing assembly according to claim 2, wherein
 the first translation detecting structure includes either at least a strain gauge or a semiconductor sensor.

8. The bicycle force sensing assembly according to claim 2, wherein
 the first translation detecting structure is arranged with respect to the first attachment member such that the first and second strain measurement directions are perpendicularly arranged with respect to each other.

9. The bicycle force sensing assembly according to claim 2, wherein
 the first translation detecting structure is arranged with respect to the first attachment member such that at least one of the first and second strain measurement directions extends along a predetermined plane which is substantially perpendicularly arranged with respect to a center axis of a crank axle receiving opening of the first attachment member.

10. The bicycle force sensing assembly according t claim 2, wherein
 the first translation detecting structure includes a single sensor having at least two strain measurement elements.

11. The bicycle force sensing assembly according to claim 2, wherein the second translation sensing device includes a second translation detecting structure that senses strain on the second attachment member in a third strain measurement direction and in a fourth strain measurement direction that is nonparallel to the third strain measurement direction.

12. The bicycle force sensing assembly according to claim 11, wherein
the second translation detecting structure includes a third translation sensor that senses strain on the second attachment member in the third strain measurement direction and a fourth translation sensor that senses strain on the second attachment member in the fourth strain measurement direction, the third and fourth translation sensors are being individual sensors.

13. The bicycle force sensing assembly according o claim 11, wherein
the second translation detecting structure includes a single sensor having at least two strain measurement elements.

14. The bicycle force sensing assembly according to claim 1, wherein
the first attachment member includes a first portion configured to be attached to the bicycle bottom bracket hanger and a second portion having the first translation detecting structure attached thereto.

15. The bicycle force sensing assembly according to claim 14, wherein
the second portion is configured to be disposed outside of the bicycle bottom bracket hanger.

16. The bicycle force sensing assembly according to claim 14, wherein
the second attachment member includes a third portion configured to be attached to the bicycle bottom bracket hanger and a fourth portion having the second translation detecting structure attached thereto.

17. The bicycle force sensing assembly according to claim 16, wherein
the fourth portion is configured to be disposed outside of the bicycle bottom bracket hanger.

18. The bicycle force sensing assembly according to claim 1, further comprising
a communication unit operatively coupled to the first and second sensing device such that the communication unit receives signals from the first and second sensing devices.

19. The bicycle force sensing assembly according to claim 18, wherein
the communication unit includes a calculation circuit.

* * * * *